United States Patent
Harutyunyan et al.

(10) Patent No.: US 11,145,856 B2
(45) Date of Patent: Oct. 12, 2021

(54) SYSTEM AND METHOD OF PRODUCING A COMPOSITE PRODUCT

(71) Applicants: HONDA MOTOR CO., LTD., Tokyo (JP); NANOSYNTHESIS PLUS, LTD., Columbus, OH (US)

(72) Inventors: Avetik Harutyunyan, Columbus, OH (US); Neal Pierce, Beavercreek, OH (US); Elena Mora Pigos, Galena, OH (US)

(73) Assignees: HONDA MOTOR CO., LTD., Tokyo (JP); NANOSYNTHESIS PLUS, LTD., Columbus, OH (US)

(*) Notice: Subject to any disclaimer, the term of this patent is extended or adjusted under 35 U.S.C. 154(b) by 773 days.

(21) Appl. No.: 15/452,500

(22) Filed: Mar. 7, 2017

(65) Prior Publication Data
US 2017/0271652 A1    Sep. 21, 2017

Related U.S. Application Data

(60) Provisional application No. 62/308,480, filed on Mar. 15, 2016.

(51) Int. Cl.
*H01M 4/36* (2006.01)
*B01J 8/00* (2006.01)
(Continued)

(52) U.S. Cl.
CPC ............ *H01M 4/362* (2013.01); *B01J 8/002* (2013.01); *B01J 8/003* (2013.01); *B01J 8/005* (2013.01);
(Continued)

(58) Field of Classification Search
CPC ...... H01M 4/362; H01M 4/505; H01M 4/525; H01M 4/587; H01M 10/0525;
(Continued)

(56) References Cited

U.S. PATENT DOCUMENTS 3,513,034 A    5/1970   Fischbach et al.
3,772,084 A    11/1973  Scholle
(Continued)

FOREIGN PATENT DOCUMENTS

CN    102482068 A    5/2012
CN    102593436 A    7/2012
(Continued)

OTHER PUBLICATIONS

Kun Kelvin Fu et al., "Flexible Batteries: From Mechanics to Devices", 2016 American Chemical Society, ACS Publications, ACS Energy Letters 1, pp. 1065-1079, (2016).
(Continued)

*Primary Examiner* — Daniel C. McCracken
(74) *Attorney, Agent, or Firm* — Arent Fox LLP

(57) ABSTRACT

A method of producing a composite product is provided. The method includes providing a fluidized bed of metal oxide particles in a fluidized bed reactor, providing a catalyst or catalyst precursor in the fluidized bed reactor, providing a carbon source in the fluidized bed reactor for growing carbon nanotubes, growing carbon nanotubes in a carbon nanotube growth zone of the fluidized bed reactor, and collecting a composite product comprising metal oxide particles and carbon nanotubes.

28 Claims, 4 Drawing Sheets

(51) Int. Cl.

| | | |
|---|---|---|
| *C01B 32/16* | (2017.01) | |
| *B01J 8/18* | (2006.01) | |
| *B01J 8/32* | (2006.01) | |
| *C01G 53/00* | (2006.01) | |
| *H01M 4/62* | (2006.01) | |
| *C01B 32/162* | (2017.01) | |
| *B01J 8/24* | (2006.01) | |
| *H01M 4/505* | (2010.01) | |
| *H01M 4/525* | (2010.01) | |
| *H01M 4/587* | (2010.01) | |
| *B82Y 30/00* | (2011.01) | |
| *B82Y 40/00* | (2011.01) | |
| *H01M 10/0525* | (2010.01) | |
| *H01M 4/02* | (2006.01) | |

(52) U.S. Cl.
CPC .......... *B01J 8/006* (2013.01); *B01J 8/0015* (2013.01); *B01J 8/0045* (2013.01); *B01J 8/1818* (2013.01); *B01J 8/1827* (2013.01); *B01J 8/1845* (2013.01); *B01J 8/24* (2013.01); *B01J 8/32* (2013.01); *C01B 32/16* (2017.08); *C01B 32/162* (2017.08); *C01G 53/44* (2013.01); *C01G 53/50* (2013.01); *H01M 4/505* (2013.01); *H01M 4/525* (2013.01); *H01M 4/587* (2013.01); *H01M 4/625* (2013.01); *B01J 2208/00407* (2013.01); *B01J 2208/00752* (2013.01); *B01J 2208/00761* (2013.01); *B01J 2219/00011* (2013.01); *B82Y 30/00* (2013.01); *B82Y 40/00* (2013.01); *C01B 2202/02* (2013.01); *C01P 2002/72* (2013.01); *C01P 2002/88* (2013.01); *C01P 2004/61* (2013.01); *C01P 2004/64* (2013.01); *C01P 2006/40* (2013.01); *H01M 10/0525* (2013.01); *H01M 2004/028* (2013.01); *Y10S 977/75* (2013.01); *Y10S 977/843* (2013.01); *Y10S 977/948* (2013.01)

(58) Field of Classification Search
CPC .......... H01M 2004/028; H01M 4/625; C01G 53/44; C01G 53/04; C01G 53/50; B01J 2208/00407; B01J 2208/00752; B01J 2208/00761; B01J 8/003; B01J 8/002; B01J 8/0045; B01J 8/1845; B01J 8/006; B01J 8/32; B01J 8/1818; B01J 8/0015; B01J 8/005; B01J 8/1827; B01J 8/24; B01J 2219/00011; C01P 2004/61; C01P 2004/64; C01P 2002/72; C01P 2002/88; C01P 2006/40; B82Y 30/00; B82Y 40/00; C01B 2202/02; C01B 32/16; C01B 32/162; Y10S 977/75; Y10S 977/843; Y10S 977/948

See application file for complete search history.

(56) References Cited

U.S. PATENT DOCUMENTS

| | | | |
|---|---|---|---|
| 5,985,175 A | 11/1999 | Fan et al. | |
| 7,094,385 B2 | 8/2006 | Beguin et al. | |
| 7,288,870 B2 | 10/2007 | Mitcham et al. | |
| 7,348,101 B2 | 3/2008 | Gozdz et al. | |
| 7,622,059 B2 | 11/2009 | Bordere et al. | |
| 7,999,028 B2 | 8/2011 | Lin et al. | |
| 8,083,905 B2 | 12/2011 | Choi et al. | |
| 8,084,158 B2 | 12/2011 | Chu et al. | |
| 8,293,204 B2 | 10/2012 | Khodadadi et al. | |
| 8,435,676 B2 | 5/2013 | Zhamu et al. | |
| 8,465,871 B2 | 6/2013 | Juzkow et al. | |
| 8,628,747 B2 | 1/2014 | Zachariah et al. | |
| 8,703,092 B2 | 4/2014 | Ziegler | |
| 8,787,001 B2 | 7/2014 | Fleischer et al. | |
| 8,825,178 B2 | 9/2014 | Feng et al. | |
| 8,883,113 B2 | 11/2014 | Richter et al. | |
| 8,974,960 B2 | 3/2015 | Manthiram et al. | |
| 8,986,872 B2 | 3/2015 | Lev et al. | |
| 9,034,421 B2 | 5/2015 | Mikhaylik et al. | |
| 9,167,736 B2 | 10/2015 | Shah et al. | |
| 9,396,829 B2 | 7/2016 | Mann et al. | |
| 9,406,985 B2 | 8/2016 | Amaratunga et al. | |
| 9,450,266 B2 | 9/2016 | Hosaka et al. | |
| 9,502,734 B1 | 11/2016 | Hsiung | |
| 9,615,473 B2 | 4/2017 | Kim | |
| 9,692,056 B1 | 6/2017 | Liu et al. | |
| 9,711,763 B2 | 7/2017 | Sohn et al. | |
| 9,782,082 B2 | 10/2017 | Gannon et al. | |
| 9,786,872 B2 | 10/2017 | Suh et al. | |
| 9,807,876 B2 | 10/2017 | Catchpole | |
| 9,812,681 B2 | 11/2017 | Heo | |
| 9,859,586 B2 | 1/2018 | Suh et al. | |
| 9,887,644 B2 | 2/2018 | Kim et al. | |
| 9,941,492 B2 | 4/2018 | Suh et al. | |
| 9,972,868 B2 | 5/2018 | Choi et al. | |
| 9,979,225 B2 | 5/2018 | Bernhard | |
| 10,033,031 B2 | 7/2018 | Wang et al. | |
| 10,090,556 B2 | 10/2018 | Rho et al. | |
| 10,096,803 B2 | 10/2018 | Iseri et al. | |
| 10,122,010 B2 | 11/2018 | Tajima et al. | |
| 10,147,915 B2 | 12/2018 | Song et al. | |
| 10,199,851 B2 | 2/2019 | Hiroki et al. | |
| 10,217,971 B2 | 2/2019 | Takahashi et al. | |
| 2003/0084847 A1 | 5/2003 | Wood et al. | |
| 2003/0099883 A1 | 5/2003 | Ochoa et al. | |
| 2004/0086783 A1 | 5/2004 | Fong et al. | |
| 2004/0234445 A1 | 11/2004 | Serp et al. | |
| 2005/0008778 A1 | 1/2005 | Utsugi et al. | |
| 2005/0063891 A1* | 3/2005 | Shaffer | B82Y 40/00 423/447.3 |
| 2005/0209392 A1 | 9/2005 | Luo et al. | |
| 2005/0221185 A1 | 10/2005 | Sakata et al. | |
| 2006/0039849 A1* | 2/2006 | Resasco | B01J 38/64 423/447.3 |
| 2006/0078489 A1 | 4/2006 | Harutyunyan et al. | |
| 2006/0116443 A1 | 6/2006 | Probst et al. | |
| 2006/0151318 A1 | 7/2006 | Park et al. | |
| 2006/0245996 A1 | 11/2006 | Xie et al. | |
| 2007/0274899 A1 | 11/2007 | Wolf et al. | |
| 2008/0131351 A1 | 6/2008 | Wang et al. | |
| 2008/0210550 A1 | 9/2008 | Walther et al. | |
| 2008/0233402 A1 | 9/2008 | Carlson et al. | |
| 2008/0258117 A1 | 10/2008 | Sakakibara et al. | |
| 2009/0117026 A1 | 5/2009 | Shimazu et al. | |
| 2009/0142659 A1 | 6/2009 | Lai et al. | |
| 2009/0208708 A1 | 8/2009 | Wei et al. | |
| 2009/0226704 A1 | 9/2009 | Kauppinen et al. | |
| 2009/0274609 A1 | 11/2009 | Harutyunyan et al. | |
| 2009/0286675 A1 | 11/2009 | Wei et al. | |
| 2010/0000441 A1 | 1/2010 | Jang et al. | |
| 2010/0038602 A1 | 2/2010 | Plee | |
| 2010/0140560 A1 | 6/2010 | Wang et al. | |
| 2010/0221606 A1 | 9/2010 | Nalamasu et al. | |
| 2010/0276644 A1 | 11/2010 | Wolf et al. | |
| 2010/0285352 A1 | 11/2010 | Juzkow et al. | |
| 2010/0285358 A1 | 11/2010 | Cui et al. | |
| 2011/0060162 A1 | 3/2011 | Tatsuhara et al. | |
| 2011/0111279 A1 | 5/2011 | Smithyman et al. | |
| 2011/0123429 A1 | 5/2011 | Bordere et al. | |
| 2011/0150746 A1* | 6/2011 | Khodadadi | C01B 32/162 423/447.3 |
| 2011/0158892 A1 | 6/2011 | Yamaki | |
| 2011/0171398 A1 | 7/2011 | Oladeji | |
| 2011/0177393 A1* | 7/2011 | Park | B82Y 30/00 429/231.8 |
| 2011/0281156 A1 | 11/2011 | Boren et al. | |
| 2011/0311874 A1 | 12/2011 | Zhou et al. | |
| 2012/0105370 A1 | 5/2012 | Moore | |
| 2012/0107683 A1 | 5/2012 | Kim et al. | |
| 2012/0132861 A1 | 5/2012 | Tamamitsu et al. | |
| 2012/0138148 A1 | 6/2012 | Harutyunyan | |

(56) References Cited

U.S. PATENT DOCUMENTS

| | | |
|---|---|---|
| 2012/0149824 A1 | 6/2012 | Hocke et al. |
| 2012/0177934 A1 | 7/2012 | Vogel et al. |
| 2012/0193602 A1 | 8/2012 | Lieber et al. |
| 2012/0241666 A1 | 9/2012 | Hong et al. |
| 2012/0282522 A1 | 11/2012 | Axelbaum et al. |
| 2012/0315539 A1 | 12/2012 | Lashmore et al. |
| 2012/0321911 A1 | 12/2012 | Watanabe et al. |
| 2013/0040229 A1 | 2/2013 | Grigorian et al. |
| 2013/0065130 A1 | 3/2013 | Ban et al. |
| 2013/0106026 A1 | 5/2013 | Wang et al. |
| 2013/0149440 A1 | 6/2013 | Pyzik et al. |
| 2013/0171485 A1 | 7/2013 | Kodera et al. |
| 2013/0189565 A1 | 7/2013 | Lashmore et al. |
| 2013/0224551 A1 | 8/2013 | Hiralal et al. |
| 2013/0256011 A1 | 10/2013 | Chang et al. |
| 2013/0323583 A1 | 12/2013 | Phares |
| 2014/0013588 A1 | 1/2014 | Wang et al. |
| 2014/0221403 A1 | 1/2014 | Kim et al. |
| 2014/0057178 A1 | 2/2014 | He et al. |
| 2014/0065447 A1 | 3/2014 | Liu et al. |
| 2014/0141248 A1 | 5/2014 | Noyes |
| 2014/0170490 A1 | 6/2014 | Izuhara et al. |
| 2014/0255782 A1 | 9/2014 | Jabbour et al. |
| 2014/0326181 A1 | 11/2014 | Kim |
| 2014/0370347 A1 | 12/2014 | Jung et al. |
| 2015/0010788 A1 | 1/2015 | Aria et al. |
| 2015/0037239 A1 | 2/2015 | Sue et al. |
| 2015/0044581 A1 | 2/2015 | Holme et al. |
| 2015/0064521 A1 | 3/2015 | Watanabe et al. |
| 2015/0087858 A1 | 3/2015 | Ci et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin et al. |
| 2015/0340741 A1 | 11/2015 | Kim et al. |
| 2015/0349325 A1 | 12/2015 | Chen et al. |
| 2015/0364750 A1 | 12/2015 | Maheshwari et al. |
| 2016/0013457 A1 | 1/2016 | Suh et al. |
| 2016/0013458 A1 | 1/2016 | Suh et al. |
| 2016/0020437 A1 | 1/2016 | Sohn et al. |
| 2016/0023905 A1 | 1/2016 | Wei |
| 2016/0036059 A1 | 2/2016 | Tokune et al. |
| 2016/0040780 A1 | 2/2016 | Donahue |
| 2016/0049569 A1 | 2/2016 | Negrin |
| 2016/0079629 A1 | 3/2016 | Abe et al. |
| 2016/0082404 A1 | 3/2016 | Pigos |
| 2016/0126554 A1 | 5/2016 | Beneventi et al. |
| 2016/0149193 A1 | 5/2016 | Seong |
| 2016/0149253 A1 | 5/2016 | Yi et al. |
| 2016/0166837 A1 | 6/2016 | Strommer et al. |
| 2016/0329533 A1 | 11/2016 | Tajima |
| 2016/0365544 A1 | 12/2016 | Lee et al. |
| 2016/0372717 A1 | 12/2016 | Noda |
| 2017/0005504 A1 | 1/2017 | Rho et al. |
| 2017/0018799 A1 | 1/2017 | Jeong |
| 2017/0033326 A1 | 2/2017 | Goto et al. |
| 2017/0040582 A1 | 2/2017 | Kim |
| 2017/0155098 A1 | 6/2017 | Park et al. |
| 2017/0155099 A1 | 6/2017 | Song et al. |
| 2017/0214052 A1 | 7/2017 | Xu |
| 2017/0263972 A1 | 9/2017 | Rho et al. |
| 2017/0288255 A1 | 10/2017 | Kim et al. |
| 2017/0338439 A1 | 11/2017 | Yokoyama |
| 2017/0338449 A1 | 11/2017 | Rho et al. |
| 2017/0338489 A1 | 11/2017 | Miwa et al. |
| 2018/0026236 A1 | 1/2018 | Lee et al. |
| 2018/0062417 A1 | 3/2018 | Choi et al. |
| 2018/0115026 A1 | 4/2018 | Mairs |
| 2018/0241081 A1 | 8/2018 | Deng et al. |
| 2018/0309117 A1 | 10/2018 | Zhu et al. |
| 2019/0027638 A1 | 1/2019 | Masuda et al. |
| 2019/0033602 A1 | 1/2019 | Lee et al. |
| 2019/0088925 A1 | 3/2019 | Harutyunyan et al. |
| 2019/0099129 A1 | 4/2019 | Kopelman et al. |
| 2019/0115633 A1 | 4/2019 | Akihisa |
| 2019/0122464 A1 | 4/2019 | Delong et al. |
| 2019/0140270 A1 | 5/2019 | Wang et al. |
| 2019/0171315 A1 | 6/2019 | Park et al. |

FOREIGN PATENT DOCUMENTS

| | | | |
|---|---|---|---|
| CN | 102674316 B | 9/2012 | |
| CN | 204072059 U | 1/2015 | |
| CN | 104752651 A | 7/2015 | |
| CN | 103219467 B | 11/2015 | |
| CN | 103715394 B | 1/2016 | |
| CN | 205375473 U | 7/2016 | |
| CN | 103280846 B | 8/2016 | |
| CN | 106024969 A | 10/2016 | |
| CN | 205697720 U | 11/2016 | |
| CN | 104392845 B | 3/2017 | |
| CN | 104362326 B | 8/2017 | |
| CN | 107086306 A | 8/2017 | |
| CN | 107611340 A | 1/2018 | |
| CN | 108878717 A | 11/2018 | |
| CN | 109088071 A | 12/2018 | |
| CN | 208690415 U | 4/2019 | |
| CN | 106129536 B | 7/2019 | |
| DE | 102017123752 B3 | 3/2019 | |
| EP | 2 213 369 A1 | 8/2010 | |
| EP | 2 476 648 A1 | 7/2012 | |
| EP | 2835177 A1 | 2/2015 | |
| JP | H06267515 A | 3/1993 | |
| JP | 11-031502 A | 2/1999 | |
| JP | 2005-272277 A1 | 10/2005 | |
| JP | 2005272277 A | 10/2005 | |
| JP | 2007049789 A | 2/2007 | |
| JP | 2010-277925 A | 12/2010 | |
| JP | 2015-105208 A | 6/2015 | |
| JP | 2015521347 A | 7/2015 | |
| JP | 2015220004 A | 12/2015 | |
| JP | 2016031922 A | 3/2016 | |
| JP | 2016054113 A | 4/2016 | |
| JP | 2016073196 A | 5/2016 | |
| JP | 2017-130274 A | 7/2017 | |
| JP | 2017/147222 A | 8/2017 | |
| JP | 2017-162637 A | 9/2017 | |
| KR | 10-1548465 B1 | 8/2015 | |
| KR | 10-2016-0047643 A | 5/2016 | |
| KR | 10-1632109 B1 | 6/2016 | |
| KR | 10-2016-0127645 A | 11/2016 | |
| KR | 10-2016-0129440 A | 11/2016 | |
| KR | 10-20160129500 A | 11/2016 | |
| KR | 10-1703516 B1 | 2/2017 | |
| KR | 10-2017-0036478 A | 4/2017 | |
| KR | 10-2017-0037510 A | 4/2017 | |
| KR | 10-1729702 B1 | 4/2017 | |
| KR | 10-1765459 B1 | 8/2017 | |
| KR | 10-1795544 B1 | 11/2017 | |
| KR | 10-1676541 B1 | 11/2018 | |
| KR | 10-2019-0040554 A | 4/2019 | |
| WO | WO 2005052053 A1 | 6/2005 | |
| WO | WO 2005/096089 A1 | 10/2005 | |
| WO | WO 2011/030821 * | 3/2011 | ............ C01B 31/02 |
| WO | WO 2012/156297 A2 | 11/2012 | |
| WO | 2014/102131 A2 | 7/2014 | |
| WO | WO 2014/153465 A1 | 9/2014 | |
| WO | WO 2015/100762 A1 | 7/2015 | |
| WO | WO 2017/052248 A1 | 3/2017 | |
| WO | WO 2017/120391 A1 | 7/2017 | |
| WO | WO 2017/131451 A1 | 8/2017 | |
| WO | WO 2018/110933 A1 | 6/2018 | |

(56) References Cited

FOREIGN PATENT DOCUMENTS

| WO | WO 2018/194414 A1 | 10/2018 |
| WO | WO 2018/194415 A1 | 10/2018 |

OTHER PUBLICATIONS

Sau Yen Chew et al., "Flexible free-standing carbon nanotube films for model lithium-ion batteries", Carbon 47, pp. 2976-2983, (2009).
Sheng Xu et al., "Stretchable batteries with self-similar serpentine interconnects and integrated wireless recharging systems," Nature communications 4:1543, DOI: 10.1038/ncomms2553, 8 Pages Total, (2013).
Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).
Zhiqiang Niu et al., "A "skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).
A. Weidenkaff et al. "Metal Nanopartides for the Production of Carbon Nanotube Composite Materials by Decomposition of Different Carbon Sources" Materials Science and Engineering C, vol. 19, pp. 119-123, 2002.
Chee Howe See et al., "CaCO3 Suppoerted Co—Fe Catalysts for Carbon Nanotube Synthesis in Fluidized Bed Reactors" Particle Technology and Fluidization, vol. 54, No. 3, pp. 657-664, Mar. 2008.
Danafar et. al., "Fluidized bed catalytic chemical vapor deposition synthesis of carbon nanotubes—A review," The Chemical Engineering Journal, vol. 155, pp. 37-48, 2009.
Dunens, O., et. al., "Synthesis of Multiwalled Carbon Nanotubes on Fly Ash Derived Catalysts," Environ. Sci. Technol., vol. 43, pp. 7889-7894, 2009.
Extended European Search Report issued in corresponding European Patent Application No. 18186402.6 dated Oct. 11, 2018.
Extended European Search Report issued in corresponding European Patent Application No. 18194469.5 dated Dec. 4, 2018.
Extended European Search Report of related European Patent Application No. 18184002.6, dated Nov. 30, 2018.
Hasegawa Kei et. al., "Lithium Ion Batteries Made of Electrodes with 99 wt% active materials and 1wt% carbon nanotubes without binder or metal foils", Journal of Power Sources, vol. 321, pp. 155-162, 2016.
Hu, Liangbing et al., Thin, Flexible Secondary Li-Ion Paper Batteries, ACS Nano, vol. 4, No. 10, pp. 5843-5848, 2010.
Luo Shu et al., "Binder-Free LiCoO2/Carbon Nanotube Cathodes for High-Performance Lithium Ion Batteries" Advanced Materials, vol. 24, pp. 2294-2298, 2012.
Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2269-2274, 2010.
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Zhao, M.Q. et. al., "Towards high purity graphene/single-walled carbon nanotube hybrids with improved electrochemical capacitive performance," Carbon, vol. 54, pp. 403-411, 2013.
Liu et al., "Carbon Nanotube (CNT)—based Composites as Electrode Material for Rechargeable Li-ion Batteries: A Review," Composite Science & Technology, vol. 72, Issue 2, Jan. 18, 2012, pp. 121-144.
Joo-Seung Kim et al., "Supporting Information, A Half Millimeter Thick Coplanar Flexible Battery with Wireless Recharging Capability", Nano Letters 2015 15 (4), 9 Pages Total, (2015).
Xiong Pu et al., "A Soft-Charging Power Unit by Integration of a Textile Tribocelectric Nanogenerator and a Flexible Lithium-Ion Battery for Wearable Electronics", Advanced Materials 27, pp. 2472-2478, (2015).
Extended Search Report of related EP Application No. 18 19 4454 dated Jul. 23, 2019.
Communication issued by the International Searching Authority in corresponding International Application No. PCT/US19/49923 dated Nov. 13, 2019.
Jenax Inc., Flexible Lithium Polymer Battery J . FLEX, Copyright 2014, (6 Pages Total).
Nanalyze., A Flexible Battery from Blue Spark Technologies, Apr. 8, 2014, (4 Pages Total).
Panasonic Corp., Panasonic Develops Bendable, Twistable, Flexible Lithium-ion Battery, Sep. 29, 2016, (8 Pages Total).
ProLogium Technology Co., Ltd., FLCB Flexible Type LCB, Copyright 2015, (6 Pages Total).
Sebastian Anthony., LG produces the first flexible cable-type lithium-ion battery, ExtremeTech, Aug. 30, 2012, (9 Pages Total).
The Swatch Group Ltd., A revolutionary battery by Belenos: The Watchmaker Swatch Group Has Signed an Agreement With the Chinese Geely Group for Use of Its Innovative New Battery., as accessed on May 29, 2019, (3 Pages Total), https://www.swatchgroup.com/en/ swatch-group/innovation-powerhouse/industry-40/revolutionary-battery-belenos.
Vishwam Sankaran., Samsung is reportedly developing a curved battery for its foldable phone, Jul. 4, 2018, (4 Pages Total).
International Search Report and Written Opinion issued by the International Search Authority in corresponding International Application No. PCT/US19/49923, dated Jan. 23, 2020.
International Search Report issued by the International Searching Authority in corresponding International Patent Application No. PCT/US2020/020993, dated Jul. 2, 2020.
Written Opinion issued by the International Searching Authority in corresponding International Patent Application No. PCT/US2020/020993, dated Jul. 2, 2020.
International Search Report and the Written Opinion issued by the International Searching Authority corresponding to PCT/US20/43017, dated Dec. 14, 2020.
Notice of Reasons for Rejection issued by the Japanese Patent Office corresponding to Japanese Application No. 2017-048275, dated Dec. 1, 2020.
Notice of Reasons for Rejection issued by the Japanese Patent Office corresponding to Japanese Patent Application No. 2017-048276, dated Dec. 1, 2020.
Notice of Reasons for Rejection issued by the Japanese Patent Office corresponding to Japanese Patent Application No. 2020-002026, dated Dec. 22, 2020.
Schiller, D., "Development of a Stretchable Battery Pack for Wearable Applications", BSc. Diss. niversit't Linz, pp. 19-37, (2019).
A.J. Clancy et al., "A One-Step Route to Solubilised, Purified or Functionalised Single-Walled Carbon Nanotunes", Journal of Materials Chemistry A, p. 16708-16715, 2015.
Beate Krause et al., "Disperability and Particle Size Distribution of CNTs in an Aqeous Surfactant Dispersion as a Function of Ultrasonic Treatment Time" Carbon 48, pp. 2746-2754, 2010.
Communication dated Aug. 26, 2019, from the European Patent Office in related European Application No. 18186402.6.
Communication dated Jul. 31, 2019, from the European Patent Office in counterpart European Application No. 18194454.7.
Extended European Search Report issued in related European Patent Application No. 18173644.8 dated Oct. 12, 2018.
Howard Wang, "Dispersing Carbon Nanotubes Usuing Surfactants" Current Opinion in Colloid & Interface Science 14, pp. 364-371, 2009.
International Search Report and Written Opinion, issued by International Searching Authority in related International Application No. PCT/US2020/039821, dated Sep. 30, 2020.
Linqin Jiang et al., "Production of Aqueous Colloidal Dispersions of Carbon Nanotubes", Journal of Colloid and Interface Science, pp. 89-94, 2003.

(56) References Cited

OTHER PUBLICATIONS

Jung, Sungrook, et al., "Wearable fall Detector using Integrated Sensors and Energy Devices", Scientific Reports, pp. 1-9, Nov. 24, 2015.
Office Action issued by the Korean Patent Office in related Korean Patent Application No. 10-2020-8005929; dated Jul. 27, 2021.
Ostfeld, Ariny E., et al., "High-performance flexible energy storage and harvesting system for wearable electronics", Scientific Reports, pp. 1-10. May 17, 2016.
Office Action Issued by Chinese Patent Office in related Chinese Patent Application No. 201710151455.7, dated Jul. 16, 2021.

* cited by examiner

SYSTEM AND METHOD OF PRODUCING A COMPOSITE PRODUCT

CROSS REFERENCE TO RELATED APPLICATION

This application claims the benefit of U.S. Provisional Application No. 62/308,480, filed Mar. 15, 2016, which is incorporated herein by reference in its entirety.

JOINT RESEARCH AGREEMENT

The presently claimed invention was made by or on behalf of the below listed parties to a joint research agreement. The joint research agreement was in effect on or before the date the claimed invention was made, and the claimed invention was made as a result of activities undertaken within the scope of the joint research agreement. The parties to the joint research agreement are 1) Honda Research Institute USA, Inc.; and 2) NanoSynthesis Plus, Ltd.

BACKGROUND

Carbon nanotubes are small tube-shaped structures essentially having a composition of a graphite sheet in a tubular form. Carbon nanotubes feature diameters less than 100 nanometers, and large aspect ratios, where the length is much greater than is the diameter. For example, a length of the CNT may be more than 1000 times the diameter. Single-walled carbon nanotubes (SWNT) are increasingly becoming of interest for various applications in nanotechnology because of their unique electronic structures, which gives them exceptional thermal, mechanical, and electrical properties. For example, SWNTs can be used in electronics, energy devices, medicine, and composite materials in order to obtain desirable physical and chemical properties. These uses require methods for producing significant quantities of SWNTs.

Processes for producing SWNTs include, but are not limited to, physical methods (e.g., electrical arc, laser ablation) and chemical methods (e.g., pyrolysis, chemical vapor deposition). Once formed, the SWNTs are sometimes distributed within a matrix material, which modifies the thermal, mechanical, and electrical properties of the matrix material. However, the enhancement of electrical or mechanical properties of matrix material by nanotube additives requires very homogeneous dispersion, no agglomeration and fine control over the nanotube/matrix ratios. Attempts have been made following the synthesis of nanotubes to disperse the nanotubes in various solvents (e.g. via surface functionalization) followed by mixing of the nanotubes with the matrix (e.g. by ball milling, sonication etc.). However, such attempts have failed to provide satisfactory dispersion of the nanotubes in the matrix as they lead to the reduction of aspect ratio, damage the nanotubes, and increase the cost of the processed material.

BRIEF DESCRIPTION

In an aspect, a method of producing a composite product is provided. The method includes fluidizing an amount of metal oxide particles within a fluidized bed reactor, providing a catalyst or catalyst precursor in the fluidized bed reactor, providing a carbon source to a carbon nanotube growth zone of the fluidized bed reactor, growing carbon nanotubes in the carbon nanotube growth zone, and providing a flow of carrier gas to the fluidized bed reactor and carrying a composite product comprising carbon nanotubes and metal oxide particles through the fluidized bed reactor.

In an aspect, a system for use in producing a composite product is provided. The system includes a fluidized bed reactor comprising an amount of metal oxide particles contained therein, an outlet, a catalyst or catalyst precursor source in fluid communication with the fluidized bed reactor to provide a flow of catalyst or catalyst precursor in the fluidized bed reactor, and a carrier gas source in fluid communication with the fluidized bed reactor to carry a composite product comprising metal oxide particles and carbon nanotubes grown in the fluidized bed reactor.

In an aspect, a method of producing a composite product is provided. The method includes providing a fluidized bed of metal oxide particles in a fluidized bed reactor, providing a catalyst or catalyst precursor in the fluidized bed reactor, providing a carbon source in the fluidized bed reactor for growing carbon nanotubes, growing carbon nanotubes in a carbon nanotube growth zone of the fluidized bed reactor, and collecting a composite product comprising metal oxide particles and carbon nanotubes.

DETAILED DESCRIPTION

The embodiments described herein relate to a composite product, and systems and methods for making the composite product. In general, the systems and methods provide for the in-situ dispersion of carbon nanotubes into a metal oxide matrix material in the course of carbon nanotube growth in a reactor. The reactor may be a fluidized bed reactor capable of aerosolization or fluidization of the metal oxide matrix material with a fluidization gas flowing from a gas distributor, such as a porous frit, from the bottom of the reactor. One or more injectors may be provided in the middle of the reactor to supply catalyst and carbon precursors for growing of the carbon nanotubes. Hence, carbon nanotubes may be grown in a cloud of fluidized metal oxide matrix material to provide in-situ mixing and, as a result, improved homogeneity of the resulting composite product containing carbon nanotubes and metal oxide matrix material. The composite product may be used in an electrode. In a non-limiting example, the composite product may be used in a cathode of a secondary lithium battery.

Figure 1:
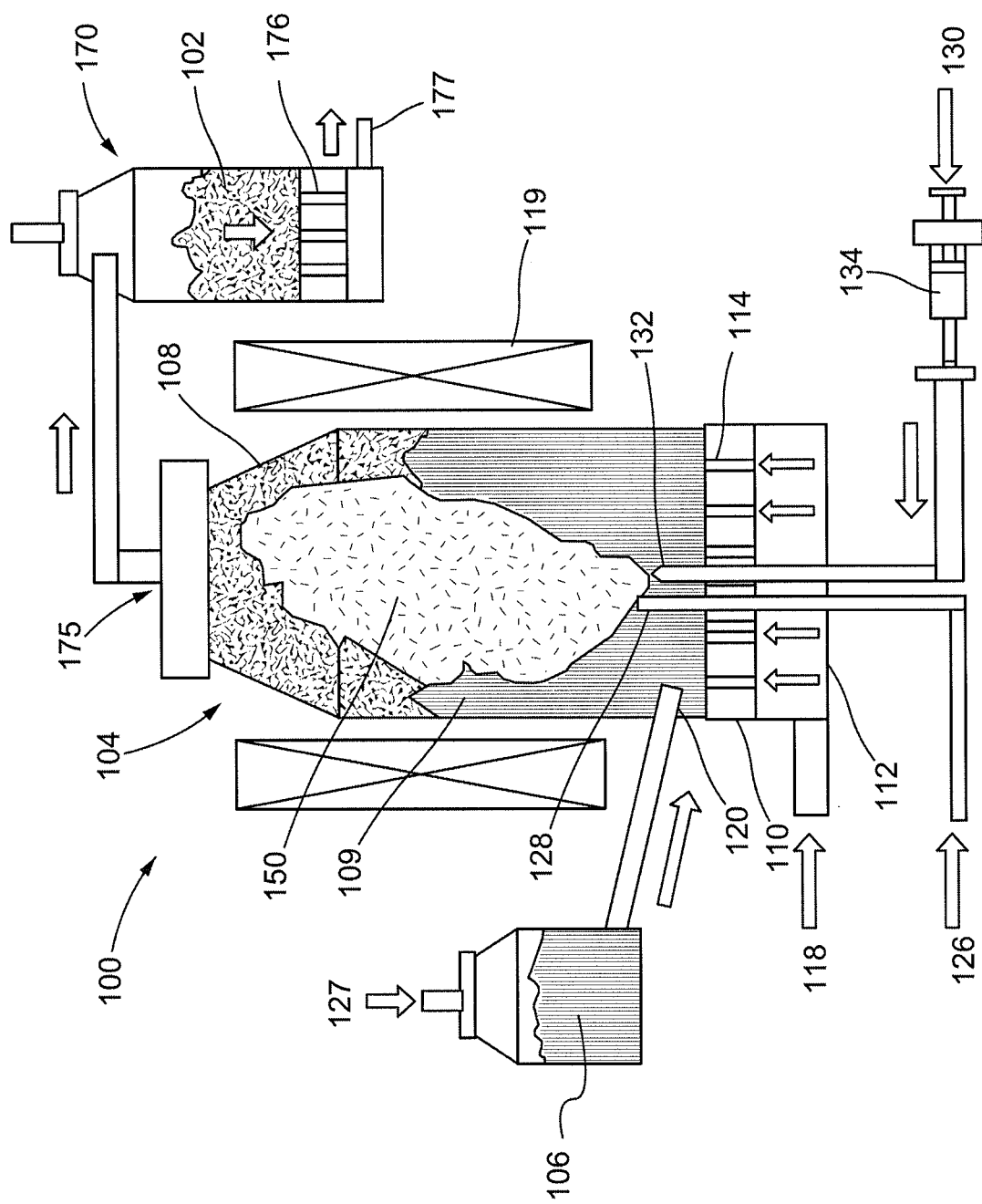
FIG. 1 is a schematic illustration of an exemplary system that may be used to produce a composite product in an aspect of the disclosure.

FIG. 1 is a schematic illustration of an exemplary system 100 that may be used to produce a composite product 102 comprising carbon nanotubes and metal oxide matrix materials. In the exemplary embodiment, system 100 includes a fluidized bed reactor 104 having an amount of metal oxide matrix material contained therein. The matrix material may be any solid, metal oxide particle that is capable of being suspended in a fluidized bed. An exemplary metal oxide includes, but is not limited to, any metal oxide that may be used in an electrode. In an illustrative example, the metal oxide is a material for use in the cathode of the battery. Non-limiting examples of metal oxides include Ni, Mn, Co, Al, Mg, Ti and any mixture thereof. The metal oxide may be lithiated. In an illustrative example, the metal oxide is lithium nickel manganese cobalt oxide ($LiNiMnCoO_2$). The metal oxide particles can have a particle size defined within a range between about 1 nanometer and about 100 microns. In a non-limiting example, the metal oxide particles have an average particle size of about 1 nanometer to about 10 nanometers.

In an illustrative example, the fluidized bed reactor 104 includes a reaction chamber 108, and a gas distributor that may comprise a porous frit 110 coupled to reaction chamber 108 and a gas plenum 112 coupled to porous frit 110. Porous frit 110 includes a plurality of flow apertures 114 defined therein such that gas plenum 112 is coupled in fluid communication with reaction chamber 108. Gas plenum 112 receives a flow of fluidizing gas from a first gas source 118. The flow of fluidizing gas is routed through plenum 112 and the porous frit 110 to fluidize the metal oxide particles in the reaction chamber 108. The fluidizing gas may be any gas capable of fluidizing the metal oxide particles to form a fluidized bed 109 of metal oxide particles. Exemplary fluidizing gases include, but are not limited to, argon, helium, nitrogen, hydrogen, carbon dioxide, and ammonia.

As shown in FIG. 1, the fluidized bed 104 may include one or more heat sources 119 for heating the reaction chamber 108 to the desired reaction temperature. For example, the reaction chamber 108 may be heated with the heat source 119 to a temperature in the range of about 450° C. to about 1100° C. depending on the catalyst or catalyst precursor and the type of nanotube desired. In one embodiment, especially to accommodate sensitive cathode materials, the reactor can be operated closer to the lower end of this temperature (e.g. ~500° C.) and in the presence of hydrogen in order to avoid converting the cathode material. In an alternative embodiment, the reactor can be operated closer to the higher end of the aforementioned temperature range (e.g. ~750° C. and above) and in the absence of hydrogen). The products obtained from operating the reactor whether at the lower or higher temperatures are not necessarily limited to SWNTs. Typically, single-walled nanotubes (SWNTs) require higher temperatures (>750° C.) while multi-walled nanotubes (MWNTs) can be grown as low as about 450° C. In a non-limiting example, the reactor his heated to a temperature of about 450° C. to about 850° C. As shown in FIGS. 2, 3, 4, and 5, lithium nickel manganese cobalt oxide is thermally stable up to at least 850° C. via TGA (FIG. 2 in air and FIG. 3 in nitrogen) and XRD (FIG. 4 and FIG. 5) measurements. Therefore, such a lithiated mixed metal oxide can be provided in a fluidized bed reactor at temperatures suitable for the growth of carbon nanotubes.

Fluidized bed reactor 104 may also include one or more inlets for introduction of the metal oxide particles, the catalyst or catalyst precursor, a carrier gas 127, and the carbon precursor for the carbon nanotubes. As shown in FIG. 1, an inlet 120 is provided for the introduction of the metal oxide particles from a metal oxide particle source 106 into the reaction chamber 108. It is to be understood that any method or device may be used to introduce the metal oxide particles into the reaction chamber 108 via the inlet 120. In a non-limiting example, the metal oxide particles may be fed into the reaction chamber 108 with a screw feeder, belt feeder, vibratory feeder, or a rotary (bulk solid) feeder. In addition, or alternatively, the metal oxide particles may be conveyed pneumatically into the reaction chamber 108. Non-limiting examples include pressure vessel conveyors, pressurized screw conveyor, airlifts, blow-through feeders, and jet feeders. The conveying gas may the same as or different than the fluidizing gas. Exemplary gases include, but are not limited to, argon, nitrogen, helium, hydrogen, carbon dioxide, and ammonia. It is to be understood that the metal oxide particles may be continuously fed into the reaction chamber 108 so that the system operates in a continuous operation of the reaction chamber 108, the metal oxide particles may be introduced in a single charge for batch operation of the reaction chamber 108, or the metal oxide particles may be intermittently added for semi-batch operation of the reaction chamber 108.

The carbon nanotubes can be synthesized using carbon precursors, such as one or more carbon-containing gases, one or more hydrocarbon solvents, and mixtures thereof. Examples of carbon-containing precursors include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. Specifically, hydrocarbon solvents may include, but are not limited to, alcohols such as methanol, ethanol, and isopropanol. The carbon precursor may optionally be mixed with a diluent gas such as hydrogen, helium, argon, neon, krypton and xenon or a mixture thereof. As shown in FIG. 1, a carbon precursor may be included in a carrier gas 127 (e.g. via carrier gas source 126) and introduced to the reaction chamber 108 via inlet 128.

The catalyst or catalyst precursors may include any catalyst or catalyst precursor that may be used in the production of carbon nanotubes. The catalyst or catalyst precursor may be one or more of an acetylacetonate, a metallocene, an acetate, a nitrate, a nitride, a sulfate, a sulfide, an oxide, a halide, a chloride, and the like. Illustrative metals for use as the catalyst include, but are not limited to, iron, nickel, cobalt, molybdenum, or a mixture thereof. Non-limiting examples of catalyst precursors include iron(III) acetylacetonate, ferrocene, iron acetate, iron nitrate, iron sulfate, and iron chloride. It is to be understood that the catalyst or catalyst precursor source may be a solid powder, a solid dispersed in a liquid, or dissolved in a solvent. As shown in FIG. 1, a catalyst or catalyst precursor source 130 may be provided in communication with the reaction chamber 108 via inlet 132 to introduce the catalyst or catalyst precursor to a carbon nanotube growth zone 150 of the reaction chamber 108. A pump, solids feeder, syringe, or any other device or method known to one of ordinary skill in the art may be used to introduce the catalyst or catalyst precursor into the carbon nanotube growth zone 150. It is to be understood that the carbon precursor may be mixed with the catalyst or catalyst precursor and introduced with the catalyst or catalyst precursor via inlet 132.

As shown in FIG. 1, a collection vessel 170 is provided for collecting the composite product of metal oxide particles and carbon nanotubes. The composite product exits the reactor 104 at outlet 175 and is collected in the vessel 170.

The vessel 170 may include a porous filter or membrane 176 that collects the composite product 102 in the vessel 170, but allows the gases leaving the fluidized bed reactor 104 through the exit 175 to be exhausted from the system via outlet 177. In a non-limiting example, the porous membrane may be a porous quartz frit. However, the present disclosure is not limited to such a collection vessel 170 and porous filter or membrane 176, as any collection system may be used that is capable of separating solid particles from a gas stream. Non-limiting examples include one or more cyclone separators and bag houses.

In a non-limiting example, the metal oxide particles can be provided with a catalyst or catalyst precursor deposited thereon prior to introduction of the metal oxide particles in the reaction chamber 108.

In operation, the growth rate of carbon nanotubes and the weight percentage of carbon nanotubes relative to the metal oxide particles in the composite product is controlled by the feed rates of the metal oxide particles, the catalyst or catalyst precursor, and the carbon precursor into the reaction chamber 108. These feed rates can be tailored to produce the desired ratio of carbon nanotubes to metal oxide particles in the composite product to meet the needs of a desired application.

Figure 2:
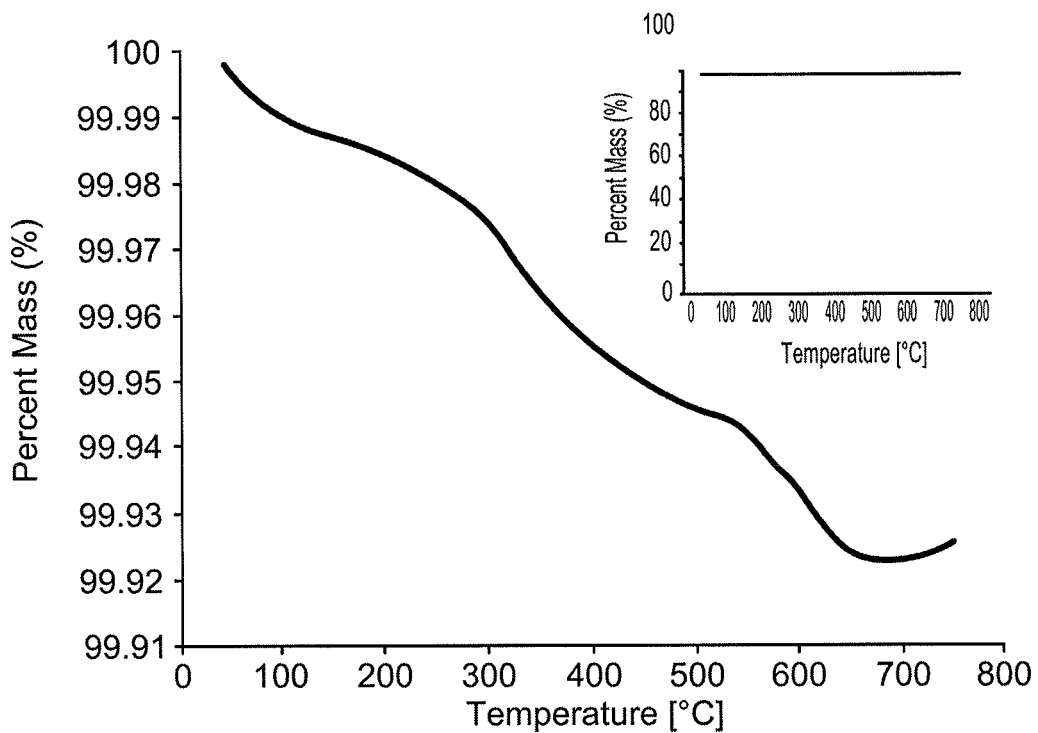
FIG. 2 is a thermogravimetric analysis (TGA) for lithium nickel manganese cobalt oxide heated to 750° C. in air.
Figure 3:
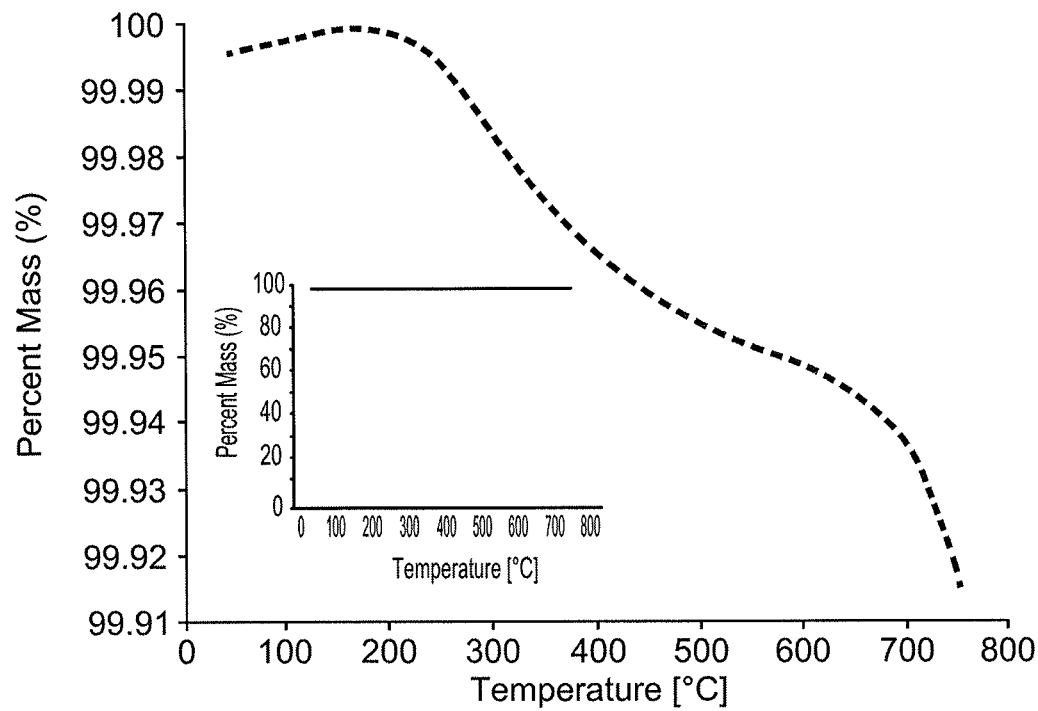
FIG. 3 is a TGA for lithium nickel manganese cobalt oxide heated to 750° C. in nitrogen.
Figure 4:
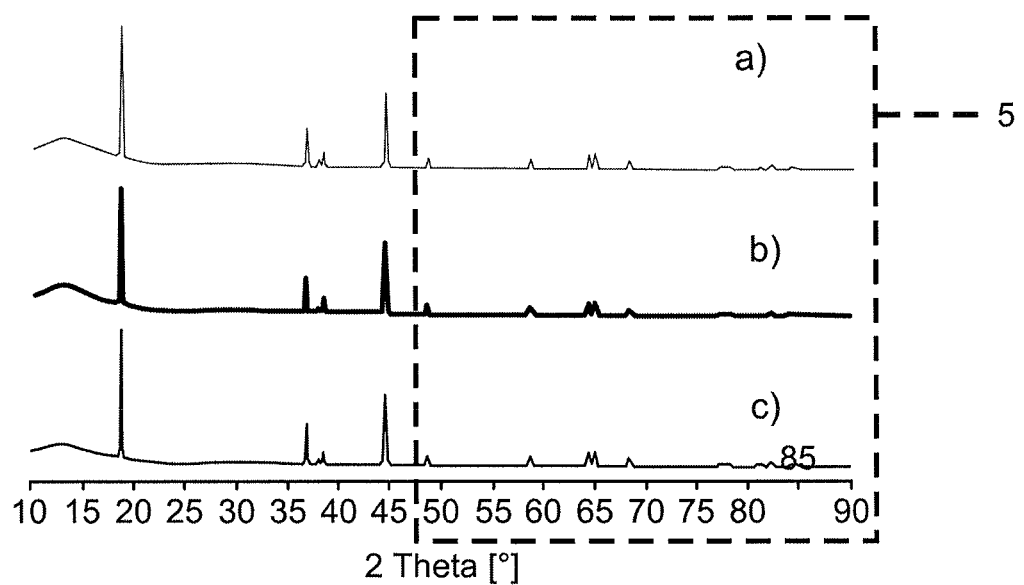
FIG. 4 is an x-ray powder diffraction (XRD) spectra for lithium nickel manganese cobalt oxide (a) as received, (b) after heating to 750° C. in air, and (c) after heating to 750° C. in nitrogen.
Figure 5:
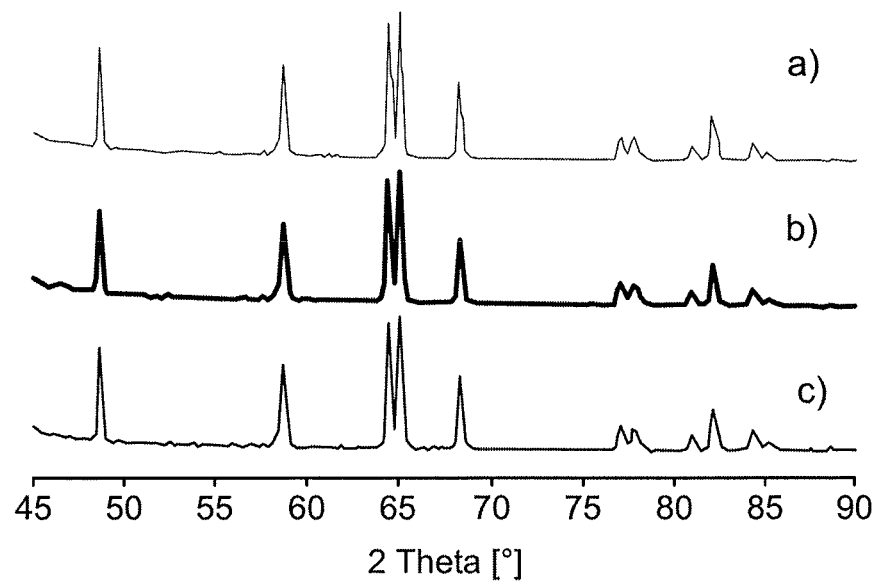
FIG. 5 is a portion of a view of the XRD spectra of FIG. 4 enlarged for magnification purposes.
Figure 6:
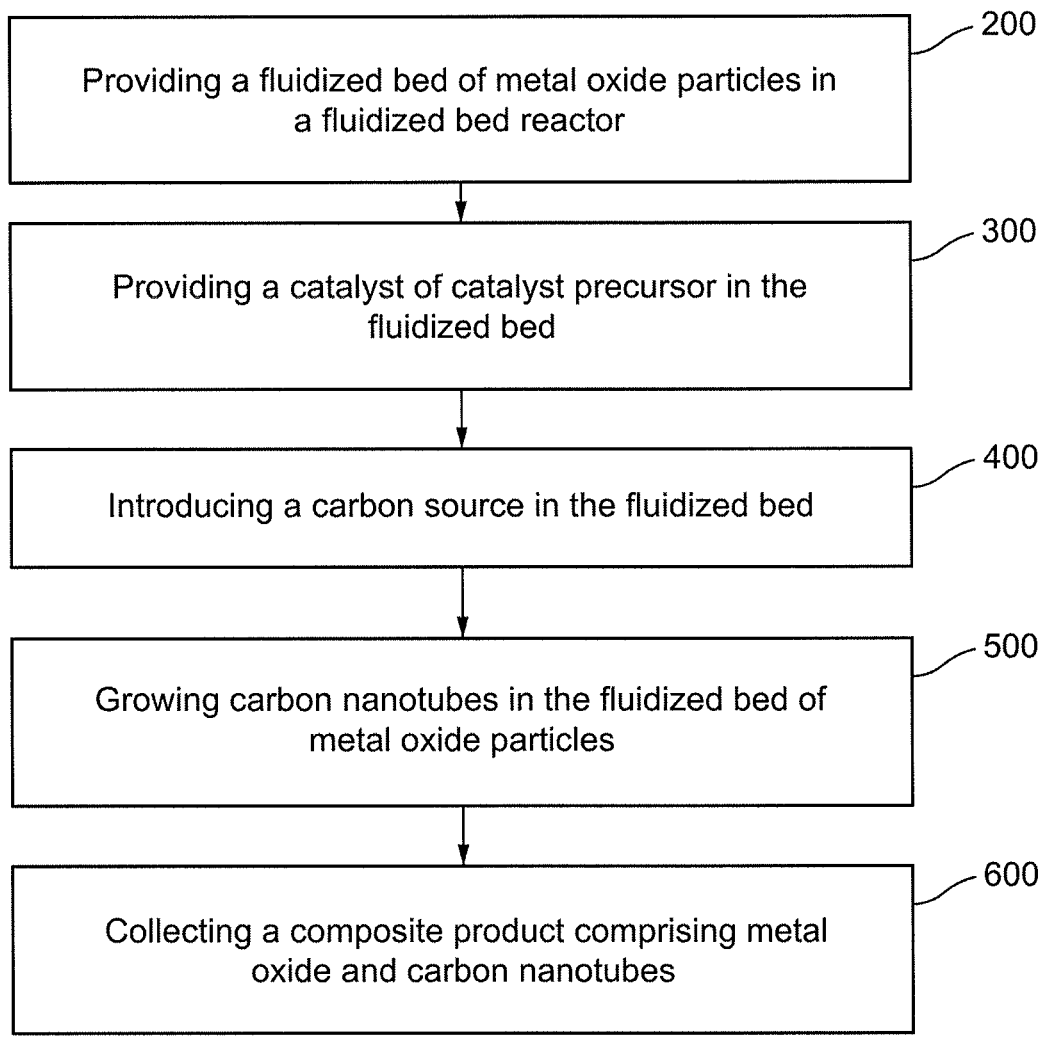
FIG. 6 is a flow diagram illustrating an exemplary series of process steps that may be used in producing a composite product in an aspect of the disclosure.

In an illustrative example as shown in FIG. 2, a method of making the composite product comprises providing a fluidized bed of a metal oxide particles (step 200), providing a catalyst or catalyst precursor in the fluidized bed (step 300), introducing a carbon source in the fluidized bed (step 400), growing carbon nanotubes in the fluidized bed (step 500), and collecting the composite product comprising metal oxide particles and carbon nanotubes (step 600). In a non-limiting example, at least some of the catalyst or catalyst precursor is deposited on the surface of the metal oxide particles and the carbon nanotubes are grown on the surface of the metal oxide particles.

EXAMPLE

Production of Composite Product

To demonstrate the method of producing a composite product comprising carbon nanotubes and metal oxide particles, the following experiment was conducted.

A quartz tube having a 2 inch diameter was provided as the reaction chamber 108 for the fluidized bed reactor 104 and a tube furnace was used as the heat source 119. The quartz tube was aligned vertically with a lower end closed with the porous frit 114. Two tubes were provided at the center of the porous frit 114 for the carrier gas inlet 128 and the catalyst/catalyst precursor inlet 132. Both inlets 128/132 were positioned below the section of the reaction chamber 108 heated by the heat source 119. Lithium nickel manganese cobalt oxide particles were used as the metal oxide particles and were poured onto the porous frit 114 to a height of about 10 millimeters. The fluidizing gas, argon, was then provided at a rate of about 350 sccm (standard cubic centimeters per minute) through the porous frit 114 at the lower end of the quartz tube to fluidize the metal oxide particles. The reactor chamber 108 was heated to a temperature of about 800° C. The carrier gas 127 included a mixture of argon (about 850 sccm) and hydrogen (about 300 sccm) and was provided to the reaction chamber 108 via inlet 128. The catalyst precursor was a solution of ferrocene (0.4 wt %) and thiophene (0.2 wt %) in ethanol. The ethanol functioned as both a solvent for the ferrocene and the carbon source for growing the nanotubes. The catalyst precursor solution was injected at a rate of 6 ml/hr via the inlet 132 into the carbon nanotube growth zone 150 where the ferrocene decomposed to iron catalyst particles having a diameter of about one nanometer, and the ethanol was converted to a carbon source for the growth of single walled nanotubes on the iron catalyst particles. The carrier gas 127 transported the composite product 102 from the nanotube growth zone 150 through the reactor outlet 175 and to the collection vessel 170. The composite product included SWCNTs and lithium nickel manganese cobalt oxide particles and comprised approximately 0.7 wt % SWCNTs.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of producing a composite product, said method comprising:
    fluidizing an amount of metal oxide particles within a fluidized bed reactor;
    providing a catalyst or catalyst precursor in the fluidized bed reactor;
    providing a carbon source to a carbon nanotube growth zone of the fluidized bed reactor;
    growing carbon nanotubes in the carbon nanotube growth zone;
    providing a flow of carrier gas to the fluidized bed reactor and carrying a composite product comprising the carbon nanotubes and the metal oxide particles through the fluidized bed reactor; and
    including the composite product in an electrode.

2. The method in accordance with claim 1, wherein carrying the composite product through the fluidized bed reactor comprises transporting the composite product towards an outlet defined near a top of the fluidized bed reactor.

3. The method in accordance with claim 1, further comprising receiving the composite product discharged from the outlet of the fluidized bed reactor in a collection vessel.

4. The method in accordance with claim 1, further comprising at least one of continuously or periodically replenishing the metal oxide particles in the fluidized bed reactor.

5. The method in accordance with claim 1, further comprising heating the carbon nanotube growth zone to a temperature greater than about 450° C. to less than about 850° C.

6. The method in accordance with claim 1, wherein providing the catalyst or catalyst precursor comprises injecting the catalyst or catalyst precursor from a bottom portion of the fluidized bed reactor and into the nanotube growth zone.

7. The method in accordance with claim 1, wherein providing the carrier gas comprises discharging a flow of the carrier gas into the nanotube growth zone and transporting the catalyst through the nanotube growth zone toward the fluidized bed reactor outlet.

8. The method in accordance with claim 1, wherein the fluidized bed reactor comprises a gas distributor positioned below the nanotube growth zone, and fluidizing the metal oxide particles within the fluidized bed reactor comprises feeding a fluidizing gas through the gas distributor at a rate sufficient to fluidize the metal oxide particles within the fluidized bed reactor.

9. The method in accordance with claim 1, wherein the metal oxide particles are mixed metal oxide particles, and the carbon nanotubes are single-wall carbon nanotubes.

10. The method in accordance with claim 1, wherein the metal oxide particles are lithiated mixed metal oxide particles, and the carbon nanotubes are single-wall carbon nanotubes.

11. The method in accordance with claim 1, wherein the fluidized bed reactor is heated to a temperature of greater than about 450° C. to less than about 850° C.

12. The method in accordance with claim 1, wherein the fluidized bed reactor is heated to a temperature of greater than about 800° C.

13. A method of producing a composite product, said method comprising:
   fluidizing an amount of metal oxide particles within a fluidized bed reactor;
   providing a catalyst or catalyst precursor in the fluidized bed reactor;
   providing a carbon source to a carbon nanotube growth zone of the fluidized bed reactor;
   growing carbon nanotubes in the carbon nanotube growth zone; and
   providing a flow of carrier gas to the fluidized bed reactor and carrying a composite product comprising the carbon nanotubes and the metal oxide particles through the fluidized bed reactor,
   wherein the metal oxide particles are lithium nickel manganese cobalt oxide particles, and the carbon nanotubes are single-wall carbon nanotubes.

14. A method of making a composite product comprising:
   providing a fluidized bed of metal oxide particles in a fluidized bed reactor of a system;
   providing a catalyst or catalyst precursor in the fluidized bed reactor;
   providing a carbon source in the fluidized bed reactor for growing carbon nanotubes;
   growing carbon nanotubes in a carbon nanotube growth zone of the fluidized bed reactor;
   collecting a composite product comprising metal oxide particles and carbon nanotubes; and
   removing the composite product from the system.

15. The method in accordance with claim 14 wherein the fluidized bed reactor includes a top and a bottom, a gas distributor is positioned below the nanotube growth zone near the bottom of the fluidized bed reactor, and the metal oxide particles are fluidized in the fluidized bed reactor by feeding a fluidizing gas through the gas distributor at a rate sufficient to fluidize the metal oxide particles within the fluidized bed reactor.

16. The method in accordance with claim 14 wherein the catalyst or catalyst precursor comprises ferrocene.

17. The method in accordance with claim 14 wherein the catalyst precursor comprises ferrocene and an alcohol, and wherein the alcohol is the carbon source for growing carbon nanotubes.

18. The method in accordance with claim 14 wherein providing the catalyst or catalyst precursor comprises injecting the catalyst or catalyst precursor via an inlet to the fluidized bed reactor, wherein the inlet is positioned below the nanotube growth zone and above the gas distributor.

19. The method in accordance with claim 14, further comprising providing a carrier gas into the nanotube growth zone for transporting the carbon nanotubes through the nanotube growth zone toward an outlet of the fluidized bed.

20. The method in accordance with claim 14, wherein the carrier gas includes the carbon source for growing carbon nanotubes.

21. The method in accordance with claim 14, further comprising receiving the composite product discharged from an outlet of the fluidized bed reactor in a collection vessel.

22. The method in accordance with claim 14, further comprising heating the carbon nanotube growth zone to a temperature greater than about 1000° C.

23. The method in accordance with claim 14, wherein the metal oxide particles are mixed metal oxide particles, and the carbon nanotubes are single-wall carbon nanotubes.

24. The method in accordance with claim 14, wherein the metal oxide particles are lithiated mixed metal oxide particles, and the carbon nanotubes are single-wall carbon nanotubes.

25. The method in accordance with claim 14, wherein the fluidized bed reactor is heated to a temperature of greater than about 450° C. to less than about 850° C.

26. The method in accordance with claim 14, wherein the fluidized bed reactor is heated to a temperature of greater than about 800° C.

27. The method of claim 14, wherein the metal oxide particles have a particle size of between about 1 nm and about 10 nm.

28. A method of making a composite product comprising:
   providing a fluidized bed of metal oxide particles in a fluidized bed reactor;
   providing a catalyst or catalyst precursor in the fluidized bed reactor;
   providing a carbon source in the fluidized bed reactor for growing carbon nanotubes;
   growing carbon nanotubes in a carbon nanotube growth zone of the fluidized bed reactor; and
   collecting a composite product comprising metal oxide particles and carbon nanotubes,
   wherein the metal oxide particles are lithium nickel manganese cobalt oxide particles, and the carbon nanotubes are single-wall carbon nanotubes.

\* \* \* \* \*